3,537,277
DEVICE FOR FEEDING GLASS TO PROCESSING MACHINES
Carsten Eden. Wackernheim, Germany, assignor to JENAer Glaswerk Schott & Gen., Mainz, Germany, a corporation of Germany
Continuation-in-part of application Ser. No. 632,261, Apr. 20, 1967. This application Dec. 22, 1969, Ser. No. 887,400
Claims priority, application Germany, May 3, 1966, J 30,733
Int. Cl. C03b 7/00
U.S. Cl. 65—324                                                      2 Claims

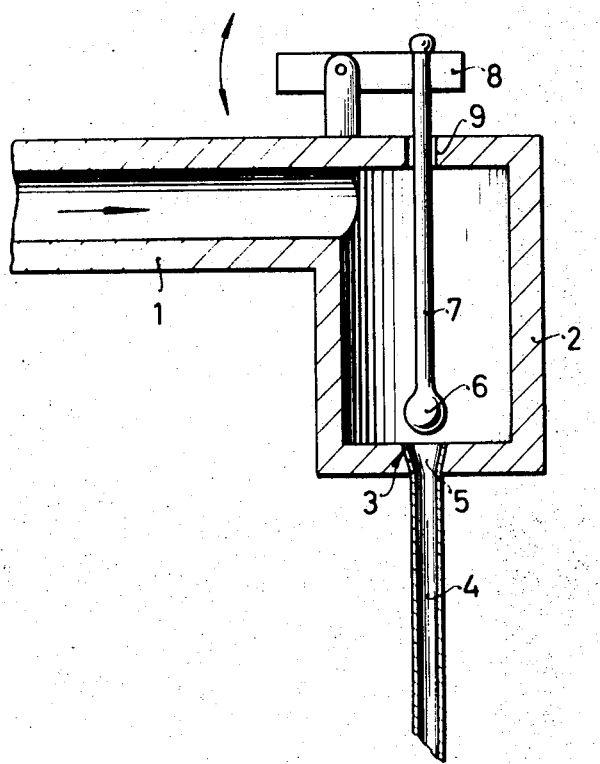

ABSTRACT OF THE DISCLOSURE

A feeding device for delivering molten glass of varying viscosity in predetermined quantities to a glass processing machine and comprising a vertically disposed pipette tube inserted with its upper end into an opening in the bottom wall of a container holding a molten glass supply. The upper end of the pipette tube is formed with a conical seat cooperating with a valve member formed by a reciprocable plunger, while the lower end of the pipette tube extends downwardly and terminates at the mold of the glass processing machine.

---

The invention relates to a device by which glass is continuously or intermittently fed to processing machines from a container which, for instance, is disposed at the end of a feed pipe and is a continuation-in-part, of my application Ser. No. 632,261 filed on Apr. 20, 1967, now abandoned.

There are known a great many glass feeding devices which all serve the same purpose of feeding a predetermined, consistently uniform quantity of glass to a glass processing machine.

One of such feeding devices is equipped with a plunger which is arranged above the outlet of a forehearth feeder and is moved at least up and down to push glass drops or individual mold fillings through the outlet opening. A pair of scissors cooperating with the plunger cuts off the dispensed glass from the supply in the feeder. Although the plunger in its lowermost position does not entirely close the outlet opening, a uniform glass drop may still be achieved by a particular size of the outlet opening and by a predetermined viscosity of the glass coordinated with the frequency of the plunger motion.

However, the essential disadvantage of such known feeders is that they are operative only within a certain viscosity range of the molten glass, but there are available a number of special glasses which tend to crystallize at the degree of viscosity required by these conventional feeders. Glasses of this kind are especially important, e.g., for optical purposes.

The invention has as its object to create a device for continuously or intermittently feeding glass to processing machines by which also the feeding of a predetermined measured quantity of glass having a low viscosity, for instance less than 30 poises, is made possible.

This object is accomplished according to the invention by the use of a downwardly directed pipette tube the upper end of which is inserted in the bottom of the container, in combination with a valve for continuously or intermittently closing the upper end of said pipette tube.

The device of the invention has proved to be extremely successful with glasses of the lowest viscosity and permits the glass strand to tear off by itself as desired. The invention makes hereby use of the fact that the viscosity of molten glass decreases logarithmically with the temperature while the surface tension decreases only linearly.

Another advantage of the device of the invention resides in the omission of cutting means heretofore necessary for cutting off the glass strand from the supply flow. In view thereof, any difficulties are avoided which heretofore arose from the cutting operation, such as bubbles and marks or contamination of the glass by scissors blades.

The device according to the invention can also be used to advantage in the discharge of discontinuous glass batches because with a falling static pressure the amount of glass discharged becomes smaller and this can be relatively easily offset by prolonging the opening periods of the valve. The device is of particular significance in working with certain optical and other special glasses which cannot be cooled down to viscosities above 30 poises because of their extremely strong tendency to crystallize. The invention device permits for the first time the production of smallest measured quantities of such highly sensitive optical glasses in the form of drops or molds directly at the feeding apparatus, and discharging the same by means of the pipette tube into the mold of a glass processing machine in which, for instance, an optical lens is to be formed. This pipette tube is necessary for the reason that it is required that the molten glass is discharged directly into the mold. The molten glass must not drop through an air space, because if the glass would be permitted to drop through an air space, it would spatter in all directions, particularly then when it drops into the mold. This spattering would be caused by the fact that the glass mass used in the device of the invention consists of glass having a relatively low viscosity.

Furthermore, the device according to the invention may advantageously be used within the customary viscosity range in all those cases where it is desired to process small production quantities with a low number of drops per time unit. The conventional feeders are not able to produce any desired low number of drops per minute. However, such a necessity may arise when with small batches and high weights per drop the furnace would be overloaded, or when small series of production with less molds or a smaller number of pieces per minute are to be handled. In all such instances, the number of drops produced per time unit can be reduced to almost any desired extent by means of the closing valve.

The valve which closes continuously or intermittently the upper opening of the pipette tube comprises a conical seat arranged at the upper end of the pipette tube and fitting in an aperture provided in the bottom of the container and a conical counter part arranged at the lower end of a reciprocable plunger. This counter part may also be ball-shaped instead of being conical. For processing high quality glasses the conical seat and the plunger may be made of platinum or a platinum alloy.

The single figure of the accompanying drawing illustrates diagrammatically and by way of example one embodiment of the invention which will be described in the following with reference to that figure.

At the right hand end of a horizontal feed pipe 1 is disposed a container 2 for receiving the molten glass from the feed pipe. The bottom of the container 2 is provided with a conical opening 3 into which the upper conically shaped end of a pipette tube 4 is inserted, the lower end of which extends downwardly and terminates at the mold of a glass processing machine. The opening 3 thus forming a conical seat 5 is closed by a valve which consists of the lower ball-shaped end 6 of a vertically extending plunger 7. The ball-shaped end 6 is only then lowered to close the upper end of the pipette tube 4 when one mold has been filled and is shifted away from the lower end of the pipette tube in order to bring another mold into charging position in alignment with the pipette tube. The plunger 7 is moved up and down by means of a mechanically operated lever mechanism. For this purpose the upper end of the plunger 7 extends through an opening 9 in the top wall of the container 2.

What I claim is:

1. A device for feeding molten glass of low viscosity, less than 30 poises, to a glass processing machine, said device comprising a container having a bottom wall and a top wall, a feed pipe connected to the upper portion of said container for supplying molten glass thereto, a vertically disposed pipette tube inserted with its upper end in an opening provided in said bottom wall of said container and extending downwardly therefrom, said pipette tube being provided at its upper end which is flush with the inner face of said bottom wall with a conical valve seat, and a vertically reciprocable valve member cooperating with said valve seat for opening and closing the upper end of said pipette tube for controlling the amount of molten glass discharged by said pipette tube without a shearing element.

2. A device according to claim 1, including a vertically disposed reciprocable plunger in said container and extending with its upper end through said top wall of said container and having said valve member arranged on its lower end, and a lever mechanism attached to the upper end of said plunger outside said container for reciprocating said plunger and valve thereon.

References Cited

UNITED STATES PATENTS

| | | | |
|---|---|---|---|
| 1,415,824 | 5/1922 | Ferngren | 65—129 |
| 1,888,963 | 11/1932 | Peiler | 65—129 |
| 2,371,213 | 3/1945 | Batchell | 65—142 |
| 2,616,124 | 11/1952 | Lyle | 65—142 |
| 2,803,925 | 8/1957 | Lausmann | 65—330 |
| 3,231,357 | 1/1966 | Pither | 65—330 XR |

S. LEON BASHORE, Primary Examiner

JOHN H. HARMAN, Assistant Examiner

U.S. Cl. X.R.

65—330; 251—333